Figure 1:
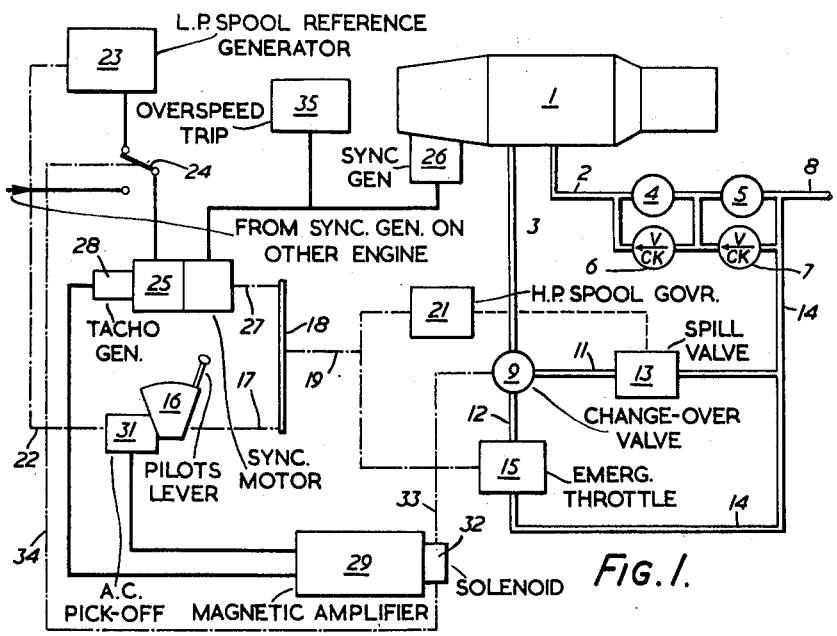

United States Patent Office 3,161,021
Patented Dec. 15, 1964

3,161,021
FUEL SYSTEM FOR TWIN SPOOL GAS
TURBINE ENGINE
Stanley R. Tyler, Cheltenham, and John M. Masterman,
Churchdown, England, assignors to Dowty Fuel Systems Limited, Cheltenham, England, a company of
Great Britain
Filed Jan. 26, 1962, Ser. No. 169,064
Claims priority, application Great Britain, Jan. 27, 1961,
3,265/61, 3,266/61
9 Claims. (Cl. 60—39.16)

This invention relates to fuel systems for internal combustion engines and is more particularly directed to fuel systems for gas turbine engines. The object of the invention is to provide an emergency fuel system operable automatically on failure of a normal fuel system.

In accordance with the present invention a fuel system for an internal combustion engine includes a normal fuel flow control and an emergency fuel flow control arranged for simultaneous and approximately similar adjustment, together with rapid switching means operative on fault or failure detection to switch from the normal fuel flow control to the emergency fuel flow control. Means to detect fault or failure may comprise means responsive to a difference between actual engine performance and the engine performance selected through the medium of the fuel flow and operative to switch from the normal fuel flow control to the emergency fuel flow control. The means to detect fault or failure may comprise a first speed signal generator, a speed regulator operative on the first generator to select a first speed signal, a second speed signal generator driven by the engine to generate a second speed signal in accordance with engine speed, a comparator for the two speed signals to generate an error signal in accordance with difference in the two speed signals and means responsive to the error signal to switch from the normal fuel flow control to the emergency fuel flow control. A delay means is preferably operable in conjuction with the regulator to prevent operation of the means responsive to error signal for a short period after adjustment of the regulator. The comparator may comprise a synchronizing motor which is connected to drive a tacho generator at a speed dependent on the speed difference of the speed signals in order to generate an error signal. The error signals as generated by the tacho generator may operate a switching means to switch from the normal fuel flow control to the emergency fuel flow control. The switching means may include a magnetic amplifier adapted on receiving the error signal to supply current to a solenoid for operation of a changeover valve to change from the normal fuel flow control to the emergency fuel flow control. Preferably the magnetic amplifier includes a self-energizing means to ensure that current continues to flow to the solenoid even though the error signal considerably reduces following operation of the emergency fuel system. Preferably the delay means should comprise a delay signal generator operable by the regulator to deliver a delay signal to the magnetic amplifier on operation of the regulator to prevent the amplifier from responding to the error signal which occurs immediately after operation of the regulator to select a different engine speed, due to the time required by the engine to accelerate and decelerate.

When the invention is used for fuel flow control of a two spool engine it may be arranged that the second speed signal generator is driven by the low pressure spool. A mechanical all speed governor may be provided to respond to the speed of the high pressure spool to control the speed thereof by controlling fuel flow to the engine, a mechanical linkage being provided from the regulator to adjust the speed setting of the all speed governor in such a way that having regard to the engine characteristics the all speed governor effects control of fuel flow to the engine over the lower engine speed range and the first and second speed signal generators effect control of fuel flow to the engine over the higher engine speed ranges by varying the speed selection of the mechanical all speed governor.

When governing a single spool engine or where governing is solely on one spool of a two spool engine the mechanical all speed governor and the second speed signal generator may be driven from the one spool.

One embodiment of the invention for use in the control of a two spool aircraft gas turbine engine will now be described with reference to the accompanying drawings.

Figure 3:
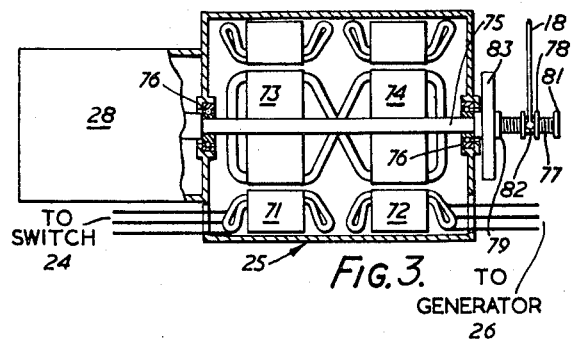
Figure 2:
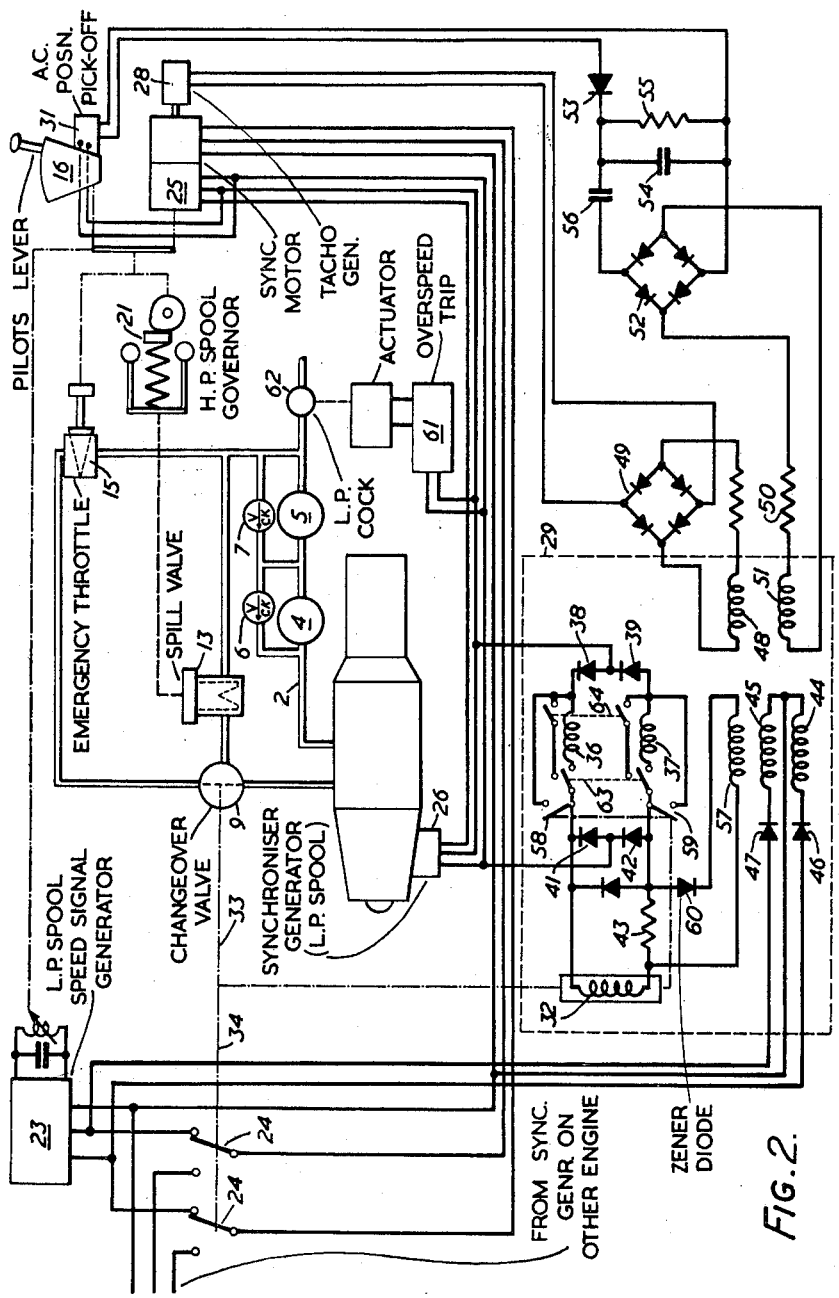

FIGURE 1 is a schematic diagram of the fuel system,
FIGURE 2 is a detailed circuit diagram of the arrangement shown in FIGURE 1, and
FIGURE 3 is a cross-section through a synchronizing motor.

Referring initially to FIGURE 1 the engine 1 with which the fuel system is used is a two-spool engine which comprises a low pressure spool having a low pressure compressor and a low pressure turbine mounted on one shaft and a high pressure spool having a high pressure compressor and a high pressure turbine carried by a hollow shaft and mounted intermediate the compressor and turbine of the low pressure spool, so that air flow through the engine passes successively through the low pressure compressor, the high pressure compressor, combustion chambers, the high pressure turbine, the low pressure turbine and the jet pipe. The combustion chambers which are located between the high pressure compressor and turbine in this example incorporate spill burner nozzles which are supplied with fuel through a pipe 2 and from which spill fuel returns through pipe 3. Spill burner nozzles are well known and need no further description. Two fuel pumps 4 and 5 are provided in series with one another and both engine driven to supply fuel to the pipe 2. A non-return valve respectively 6 and 7 is provided for each pump. Fuel is supplied from a tank at boost pressure through pipe 8 to the inlet of pump 5. The pumps 4 and 5 are each capable of delivering sufficient fuel at a sufficient pressure to operate the engine at full performance so that in the event of one pump breaking down fuel may pass the non-return valve of that pump to permit supply to the engine. The spill pipe 3 extends to a changeover valve 9 which operates to connect the pipe 3 either to pipe 11 or to pipe 12. The pipe 11 extends to a spill valve 13 which in conjunction with its controls forms the normal fuel flow control system. The pipe 12 connects to the throttle 15 which in conjunction with its controls, forms the emergency fuel flow control system. Flow from the spill valve 13 and the throttle 15 both enter a pipe 14 leading to the inlet of pump 5.

The regulator is formed by the pilot's control lever 16 which acts through a linkage 17 onto a floating lever 18 from which a linkage 19 extends jointly to a speed governor 21 driven by the high pressure spool of the engine and the emergency throttle 15. Since the emergency safeguards of the fuel system are only intended for use at low altitudes it is possible to arrange that for any setting of the governor 21 by the lever 16 the emergency throttle 15 is also set at substantially the same value that the spill valve 13 would be controlled to by the governor 21. The governor 21 acts directly or through a suitable servo motor on the spill valve 13 to adjust fuel flow through the spill passage 3 to maintain a selected speed of the engine.

The pilot's lever 16 is also connected by a linkage 22 to a speed signal generator 23 mounted independently of the engine within the aircraft. This speed signal generator may take any suitable form and may comprise a transistor oscillator having no moving parts or alternatively it may comprise a tacho generator driven by a variable speed electric motor. The signal generator 23 whatever its construction will generate an alternating current whose frequency depends on the position of lever 16. The output from the generator 23 passes through a switch 24 to one stator 71 of a synchronizing motor 25 (see FIGURE 3). The other stator 72 of the synchronizing motor 25 is fed by alternating current produced by generator 26 driven by the low pressure spool of engine 1. The synchronizing motor 25 which is a brushless synchro includes a pair of rotors 73 and 74 fixedly mounted on a shaft 75 carried by bearings 76. The rotors 73 and 74 are polyphase rotors electrically cross connected at their adjacent ends. The alternating current supplied to the stators 71 and 72 is such as to produce magnetic fields rotating in opposite directions. The cross connection of the rotor winding causes the rotor shaft 75 to take up a position proportional to the phase difference of the two stator supplies and thus to rotate at a speed proportional to the frequency difference of the two supplies. At one end of the synchronizing motor 25 the shaft 75 is connected to drive a tacho generator 28. The opposite end of the shaft 75 projects from the synchronizing motor 25 into a slipping clutch 83 from which extends a screw threaded portion 77 on which a nut 78 is mounted. A pair of stops 79 and 81 are provided one at either end of the screw thread 77. The nut 78 includes a pivotal connection 82 with one end of the lever 18, the pivotal connection being such that nut 78 is prevented from rotation by the lever 18 so that rotation of the shaft 75 will cause movement of the pivotal connection 82 in one direction or the other along the threaded portion 77. When the nut engages one or other stop the motor may continue to rotate by reason of clutch 83. For the purpose of convenience the clutch 83, the screw threaded portion 77 and the nut 78 are indicated in FIGURES 1 and 3 by the reference numeral 27. The output from the tacho generator 28 is connected to a magnetic amplifier 29. The pilot's lever 16 also operates an A.C. pick-off device 31 whose output is fed to the magnetic amplifier 29 in opposition to the output from the tacho generator 28. The A.C. pick-off device 31 is of well known construction and comprises fixed primary and secondary windings variably linked by a magnetic core moved by movement of the lever 16. The primary winding is energized with alternating current and the voltage induced in the secondary winding is arranged to be proportional to movement of the magnetic armature. The amplifier 29 is connected to a solenoid 32 which in turn is connected by a mechanical linkage 33 for operation of the changeover valve 9. The solenoid valve 32 is also connected by a linkage 34 to the switch 24 which is capable of connecting stator 71 of synchronizing motor 25 either to the reference generator 23 or to another alternative reference generator. Normally of course the switch 24 will connect reference generator 23 to the stator 71. The alternating current output from the synchronizing generator 26 may also be connected to an overspeed trip device 35 whose function is to cause cutting off of fuel flow to the engine in the event of serious overspeed of the low pressure spool. In normal operation at lower engine speeds, synchronizing motor 25 will have rotated for a reason that will shortly be apparent to engage the stop 81 whereby the pivot pin 82 will form a fixed fulcrum for lever 18. Movement of the pilot's control lever 16 will therefore move the lever 18 about this fulcrum to adjust directly the selected speed for the high pressure spool governor 21. The engagement of the nut 78 against its end stop is ensured by arranging that the linkage 22 between the pilot's lever 16 and the reference generator 23 causes the latter to generate a frequency considerably lower than any frequency that might be generated by a generator 26 within the low engine speed range. This will have caused rotation of the synchronizing motor to the position where the nut 78 engages stop 81 at which point clutch 83 will slip to permit synchronizing motor rotation. In this way the engine fuel flow is controlled completely by the high pressure spool governor. This is desirable since through the range of engine speed the high pressure spool has proportionally a far smaller range of speed than the low pressure spool. In the upper engine speed range, however, at or near maximum power it is usually desired to control by the speed of the low pressure spool. As engine speed is increased into the higher speed range by the lever 16 the link 22 is arranged to raise the frequency of the reference generator 23 to an operative value. When this occurs such higher frequency is fed to the stator 71 of the synchronizing motor 25 causing it to rotate in accordance with the excess in frequency over the frequency delivered by the synchronizing generator 26 to the stator 72. Such movement will cause nut 78 to move along the threaded portion 77 of the synchronizing motor 25 to cause movement of lever 18 and of the link 19 to raise the selected speed for the governor 21 over and above that which is selected by the lever 16. It will be seen that adjustment of the governor 21 is now by virtue of the frequency error between the two signals from the generators 23 and 26. Accordingly control of the spill valve 13 will now be in accordance with such a frequency error which of course must be reduced to zero by operation of the synchronizing motor.

In the event that a fault occurs within the fuel system in the higher speed range of operation of the engine the engine speed will clearly not correspond to that selected by the lever 16 and the synchronizing motor 25 will rotate in such a manner as to move the lever 18 and to adjust governor 21 to tend to correct the error. Such movement, however, will also move the tacho generator 28 to supply bias voltage to the main magnetic amplifier 25 which in turn causes operation of solenoid 32 and the operation of changeover valve 9 through link 33. Also the solenoid 32 causes switch 24 to be moved to select another reference generator. It should be explained that in order to cause operation of the solenoid 32 a certain predetermined output must be attained from the tacho generator 28 which is greater than the output that might normally occur during normal speed governing action. In order to prevent operation of solenoid 32 during normal movement of lever 16 to select a different speed in the higher speed range, the A.C. pick-off 31 is arranged, on movement of lever 16, to supply electric current to the magnetic amplifier in opposition to the current supplied by the tacho generator 28 to nullify its effect.

No provision is made in this example to cause changeover of the fuel system in the lower speed range when governor 21 controls engine speed since in these lower speed ranges the aircraft propelled by the engine would not be in a vulnerable position where immediate changeover action is necessary if a fault occurs.

When the solenoid 32 has operated due to failure of the engine to respond correctly, the emergency throttle 15 will control fuel flow to the engine. Since this emergency throttle is adjusted to follow substantially the adjustments which the spill valve 13 should normally receive the changeover will result in approximately the correct fuel flow being delivered to the engine, this fuel flow being under the direct control of the pilot through lever 16, link 17, lever 18 and link 19 so that it is immediately possible for the pilot to adjust engine speed. The operation of the switch 24 by solenoid 32 to select another reference generator permits the synchronizing motor, if it is not at fault, to operate to trim the control exerted by the pilot through lever 16 by movement of the nut 78 to trim a control exerted by the pilot on lever 16 so as to tend to synchronize engine speed to the value selected by the second reference generator.

The fuel system as described is particularly intended for use on vertical take-off and landing aircraft during the take-off and landing conditions. Since such aircraft may be powered for example by two such engines as indicated in FIGURE 1 it is convenient to use as the emergency reference generator the synchronizing generator of the other engine so that the two engines will be synchronized one to the other in the emergency conditions. It will be seen that the changeover can be effected with only a very small time delay. Such a small time delay for emergency operation to take place is essential in the control of vertical take-off and landing aircraft during take-off or landing operations. Means may be provided in the fuel system to enable the pilot to render the emergency system inoperative during normal flight at altitudes where a much greater time interval is available to deal with any emergency that might arise, and where normal flying controls are effective.

Reference is now made to FIGURE 2 of the accompanying drawings which illustrates the system of FIGURE 1 in greater detail. Similar parts will however carry similar reference numerals. More particularly the magnetic amplifier 29 is now shown in much greater detail. It comprises a pair of auto-excited windings 36 and 37 on a magnetic core fed from one phase of the three phase output of the synchronizer generator 26 through two pairs of rectifiers 38, 39 and 41, 42. The rectifiers 38 and 39 serve in known manner to direct alternate half cycles of the supply through the coils 36 and 37 whilst the rectifiers 41 and 42 serve to ensure that the current, having passed through the coils 36 and 37 will pass in a unidirectional manner through the solenoid 32 and a resistor 43 in series therewith. The arrangement of the rectifiers 38 and 39 in the absence of other controlling effects would cause auto-excitation of the windings 36 and 37 so that they offer little impedance to the flow of alternating current by virtue of magnetic saturation of the core by the direct current produced by rectifiers 38 and 39. The amplifier also includes a pair of bias coils 44 and 45 fed from the two phases of the reference generator 23 through rectifiers 46 and 47, this bias being such that the magnetic saturation of the core by D.C. components in coils 36 and 37 is neutralised. When a current flows in coils 44 and 45 the coils 36 and 37 will offer considerable impedance to the flow of current with the result that very little current flows through the solenoid 32. The balance of the magnetic amplifier may be upset, i.e. the core may be again magnetically saturated, by the supply of direct current in a signal coil 48 which is fed through a full wave rectifier 49 from the output of tacho generator 28. Tacho generator 28 is of the permanent magnet single phase type whose output is proportional to the speed of rotation. Thus the current through coil 48 is proportional to the speed of rotation of the synchronizing motor 25. The current in the coil 48 is arranged to be in such a direction that the balance of the magnetic amplifier is upset by it and the impedance of the coils 36 and 37 will be reduced by it to the extent to cause considerable current to flow through the solenoid 32. In order to prevent normal adjustment of the pilot's lever 16 causing energisation of the solenoid 32, a neutralising coil 51 is provided in the magnetic amplifier which is fed from a full wave rectifier 52 in such a direction as to neutralise the effect of the coil 48. Supply for the full wave rectifier 52 is obtained from the pick-off device 31 connected to the pilot's lever. The output from the secondary of the pick-off device is rectified by rectifier 53, the rectified current flowing to reservoir capacitor 54. Resistor 55 bleeds current from the capacitor 54 so that the rectified voltage appearing across it is proportional to the position taken up by the pilot's lever. A capacitor 56 connects the capacitor 54 to the full wave rectifier 52 so that change of rectified voltage appearing across capacitor 54 causes current to flow through the resistor 50 and coil 51 in one direction independently of the direction of change of voltage at capacitor 54. Thus it will be seen that any change in position of the pilot's lever results in a current flowing through the coil 51 which is arranged to neutralise the current flowing through the coil 48 which results from rotation of the tacho generator 28. The time during which effective current flows through winding 51 depends on the resistance in the circuit which includes resistor 50 and the capacitance of capacitor 56 whereby a large movement of pilot's lever 16 will result in a large flow of effective current through winding 51 and a small movement of lever 16 will result in a small current flow through the winding 51. The time during which such effective current flows is arranged to be slightly greater than the time taken normally for the engine to change speed to comply with the speed selected by the pilot's lever. Where the speed of the engine alters other than in accordance with movement of the pilot's lever synchronizing motor 25 will move in response to the frequency difference between its two supplies and will also rotate the tacho generator 28 continuously whilst such frequency difference exists. The tacho generator current will then energise coil 48 in the magnetic amplifier. Since there is no opposing current through coil 51 the amplifier will be energised to cause current to flow through solenoid 32 to switch the fuel system over to the emergency control. In order to ensure positive switching action of the magnetic amplifier to switch solenoid 32 into the emergency position a further winding 57 is provided which is fed through a Zener diode 60 from resistor 43. Zener diode 60 will only conduct when a certain voltage difference occurs across it with the result that when this voltage occurs current flows through coil 57 to ensure rapid reduction in impedance of the coils 36 and 37. As a means to ensure that the solenoid 32 cannot return to the normal state a pair of switches 58 and 59 are provided for the coils 36 and 37 and which on operation of the solenoid 32 are moved to short circuit the coils 36 and 37. This enables the heat dissipation in coils 36 and 37 to be very small which in turn enables the magnetic amplifier to be of small size and light weight.

In the event of an engine fault which might cause overspeed of the low pressure rotor an overspeed trip 61 is provided to operate a fuel cock 62 to shut off fuel to the engine. The overspeed trip comprises an electrical tuned circuit arranged to allow substantial flow of electricity from one phase of the synchronizing generator 26 when the speed becomes excessive, for example at 110% of the normal maximum speed.

The fuel system as described is particularly intended for controlling an engine of a vertical take-off and landing aircraft and it is desirable that the emergency control as described should only be operative during take-off and landing and that in normal flight the emergency system should be inoperative. For this purpose a two way switch 63 is provided in the magnetic amplifier to disconnect the windings 36 and 37 automatically as a result of trimming of the aircraft for horizontal flight. In effect the control operated by the pilot to change from vertical to horizontal flight is arranged also to operate a switch 63. The disconnection effected by switch 63 effectively prevents current being supplied to solenoid 32. However, it is still possible during horizontal flight that a fault might occur with the fuel system which might require that the pilot should switch to the emergency system and for this purpose a further switch 64 is provided to by-pass the coils 36 and 37 in order to supply current to solenoid 32. This circuit is prepared for operation by the operation of switch 63 during transition to horizontal flight. Thus during an emergency in horizontal flight the pilot may close switch 64 which will supply electric power to the solenoid 32 to change the fuel system over to the emergency control.

For the purpose of ground testing the installation as described a test switch is provided to disconnect the three-phase output from the synchronizer generator 26 and to connect it to the three-phase output from a variable frequency test generator which is preferably a piece of ground equipment. In this way it will be possible to apply a variable frequency three-phase supply to test the whole fuel system other than of course the actual supplying of fuel by the fuel pumps to the engines.

Whilst the described example is particularly intended for a two spool engine it is possible to use the described arrangement with small modification only for a single spool engine by connecting generator 26 to be driven by the single spool and arranging that synchronizing motor 25 may operate directly on the spill valve or equivalent.

In the described example acceleration controls are not shown but in practice these will be provided to come into operation automatically when increased engine speed is selected. The emergency fuel system may have a simple acceleration control effective for sea level use only.

We claim as our invention:

1. A fuel system for an internal combustion engine comprising a normal fuel flow control, an emergency fuel flow control, an operative connection between the two fuel flow controls to insure simultaneous and similar adjustment, a first speed-signal generator, a regulator operative on the first speed-signal generator to select the first speed-signal, a second speed-signal generator driven by the engine to generate the second speed-signal in accordance with engine speed, a synchronizing motor fed with the two speed-signals, an error signal generator driven by the synchronizing motor at a speed dependent on the difference of the speed-signals to generate an error signal, trimming means responsive to small error signals to modify the setting of the two fuel flow controls to tend to reduce the error signal to zero whereby to control engine speed in accordance with regulator setting, rapid switching means responsive to generation of a large error signal to switch from the normal fuel flow control to the emergency fuel flow control, and delay means operable on resetting of the regulator to select a new engine speed to prevent operation of the rapid switching means for a short period in response to the large error signal following resetting of the regulator.

2. A multi-engined aircraft having for each engine a fuel system as claimed in claim 1 and including for each engine a switch means which is adapted also to switch from the first speed signal generator to the speed signal generator of another engine.

3. A fuel system as claimed in claim 1 wherein the switching means includes a magnetic amplifier, a solenoid adapted to be fed with current from the amplifier, and a change-over valve for the fuel flow controls operable by the solenoid for changing from the normal fuel flow control to the emergency fuel flow control, the magnetic amplifier operating to pass current through the solenoid when it receives a large error signal and including self energising means to ensure that current continues to pass through the solenoid if the error signal should reduce following operation of the emergency fuel control.

4. A fuel system as claimed in claim 3 wherein the delay means comprises a delay signal generator operable by the regulator to deliver a delay signal to the magnetic amplifier on resetting of the regulator to prevent the amplifier from responding for a short time to the resulting large error signal.

5. A fuel system as claimed in claim 4 wherein the delay signal generator comprises a generator to generate a direct voltage proportional to regulator position and a series circuit including a capacitor and a control winding of the magnetic amplifier through which current passes from the generator on change of the direct voltage.

6. A fuel system as claimed in claim 5 for use with a two-spool engine wherein the second speed signal generator is driven by the low pressure spool.

7. A fuel system as claimed in claim 6 including a mechanical all speed governor to respond to speed of the high pressure spool for controlling the speed thereof by controlling fuel flow to the engine, and a mechanical linkage from the regulator to adjust the speed setting of the all speed governor, the linkages respectively from the regulator to the all speed governor and to the first speed signal generator being arranged relative to the engine characteristics such that over the lower engine speed range the high pressure spool governor effects control of engine speed and over the higher speed range the first and second speed signal generators effect control of engine speed.

8. A fuel system as claimed in claim 7 wherein the all speed mechanical governor is connected to the regulator by a variable linkage which in the higher speed range modifies the high pressure spool governor setting in accordance with the error signal whereby control is effected by the first and second speed signal generators, but in the lower speed range acts to connect the high pressure spool governor substantially directly to the regulator to effect control of engine speed.

9. A fuel system as claimed in claim 8 wherein the linkage between the regulator and the high pressure spool governor includes a floating lever arranged in the higher speed range to adjust the high pressure spool governor in accordance with the difference between regulator position and the movement of the synchronizing motor resulting from speed difference between the first and second speed signals and in the lower speed range when the comparator engages its limiting abutment to provide a fixed fulcrum for the floating lever at the comparator to give a substantially direct connection between the regulator and the high pressure governor.

References Cited in the file of this patent

UNITED STATES PATENTS

| 2,532,856 | Ray | Dec. 5, 1950 |
| 2,628,472 | Dray | Feb. 17, 1953 |
| 2,639,584 | Schorn | May 26, 1953 |
| 2,669,838 | Lee | Feb. 23, 1954 |

FOREIGN PATENTS

| 508,663 | Canada | Dec. 28, 1954 |